(12) United States Patent
Ose

(10) Patent No.: US 7,437,969 B2
(45) Date of Patent: Oct. 21, 2008

(54) BICYCLE SHIFT OPERATING DEVICE

(75) Inventor: Kenji Ose, Sakai (JP)

(73) Assignee: Shimano Inc., Osaka (JP)

( * ) Notice: Subject to any disclaimer, the term of this patent is extended or adjusted under 35 U.S.C. 154(b) by 401 days.

(21) Appl. No.: 10/952,558

(22) Filed: Sep. 29, 2004

(65) Prior Publication Data

US 2006/0070479 A1 Apr. 6, 2006

(51) Int. Cl.
*F16C 1/10* (2006.01)
(52) U.S. Cl. .................................. 74/502.2; 74/501.6
(58) Field of Classification Search ............... 74/502.2, 74/505.5, 489, 473.3, 502
See application file for complete search history.

(56) References Cited

U.S. PATENT DOCUMENTS

| | | | |
|---|---|---|---|
| 4,532,825 A | | 8/1985 | Nagano |
| 4,995,280 A | | 2/1991 | Tagawa |
| 5,009,629 A | * | 4/1991 | Tagawa ....................... 474/80 |
| 5,012,692 A | | 5/1991 | Nagano |
| 5,044,213 A | | 9/1991 | Nagano |
| 5,094,120 A | | 3/1992 | Tagawa |
| 5,095,768 A | | 3/1992 | Nagano |
| 5,203,213 A | * | 4/1993 | Nagano ................... 74/473.14 |
| 5,213,005 A | | 5/1993 | Nagano |
| 5,241,878 A | | 9/1993 | Nagano |
| 5,400,675 A | | 3/1995 | Nagano |
| 5,609,064 A | | 3/1997 | Abe |
| 5,617,761 A | | 4/1997 | Kawakami |
| 5,673,594 A | | 10/1997 | Huang et al. |
| 5,701,786 A | | 12/1997 | Kawakami |
| 5,730,030 A | | 3/1998 | Masui |
| 5,732,593 A | | 3/1998 | Hwang et al. |
| 5,755,139 A | | 5/1998 | Kojima |
| 5,791,195 A | | 8/1998 | Campagnolo |
| 5,862,709 A | * | 1/1999 | Kageyama ................... 74/489 |
| 5,921,138 A | | 7/1999 | Kojima et al. |
| 5,957,002 A | | 9/1999 | Ueng |
| 6,095,010 A | | 8/2000 | Areiter et al. |
| 6,155,132 A | | 12/2000 | Yamane |
| 6,450,060 B1 | * | 9/2002 | Shahana .................... 74/502.2 |
| 6,497,163 B2 | | 12/2002 | Liu et al. |
| 6,502,477 B1 | | 1/2003 | Assel |

(Continued)

FOREIGN PATENT DOCUMENTS

DE 201 22 305 U1 2/2005

(Continued)

*Primary Examiner*—Richard W L Ridley
*Assistant Examiner*—Matthew Johnson
(74) *Attorney, Agent, or Firm*—Global IP Counselors, LLP

(57) ABSTRACT

A bicycle shift operating device is provided that includes a first shift operating member, a second shift operating member and a transmission control mechanism. The first shift operating member is pivotally coupled to a first pivot axle for rotation about a first pivot axis to move along a first shifting plane that is perpendicular to the first pivot axis. The second shift operating member is pivotally coupled to a second pivot axle for rotation about a second pivot axis to move along a second shifting plane that is perpendicular to the second pivot axis and intersects the first shifting plane to form an angle equal to or less than about thirty degrees between the first and second shifting planes. The transmission control mechanism is configured to control a bicycle transmission. The transmission control mechanism is operatively coupled to the first and second shift operating members.

23 Claims, 9 Drawing Sheets

U.S. PATENT DOCUMENTS

| | | |
|---|---|---|
| 6,862,948 B1 * | 3/2005 | Calendrille, Jr. ............ 74/502.2 |
| 2001/0042421 A1 | 11/2001 | Feng et al. |
| 2002/0020246 A1 | 2/2002 | Campagnolo |
| 2002/0124678 A1 | 9/2002 | Chen |
| 2003/0094064 A1 | 5/2003 | Dal Pra' |
| 2003/0126940 A1 | 7/2003 | Kawakami |
| 2005/0204854 A1 | 9/2005 | McLaughlin et al. |

FOREIGN PATENT DOCUMENTS

| | | |
|---|---|---|
| JP | 03-028093 A | 2/1991 |
| JP | 11-245873 A | 9/1999 |
| WO | WO 2006/050153 A2 * | 5/2006 |
| WO | WO-2006/050153 A2 | 5/2006 |

* cited by examiner

BICYCLE SHIFT OPERATING DEVICE

BACKGROUND OF THE INVENTION

1. Field of the Invention

This invention generally relates to a bicycle shift operating device. More specifically, the present invention relates to a bicycle shift operating device, which includes shift operating levers that move about non-parallel, non-perpendicular pivot axes to actuate a bicycle transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, the bicycle shifting mechanisms or shift operating devices have been extensively redesigned.

The bicycle shifting mechanisms are parts of the bicycle transmission. The bicycle transmission typically includes front and rear shifting mechanisms designed to operate front and rear derailleurs to move the front and rear derailleurs laterally over a plurality of front and rear sprockets, respectively. The front and rear sprockets are usually coupled to the front crank and the rear wheel, respectively, such that the pedaling force from the rider is transferred to the rear wheel via the chain. Depending on the position of the chain on the front and rear sprockets, a variety of gear ratios can be provided.

In the past, shifting mechanisms or devices have been utilized that include one or more levers that are pivoted in order to wind and unwind an inner wire of a control cable. Alternatively, rotating hand grips have also been utilized to wind and unwind the inner wire of the control cable. Two shifting mechanisms are typically provided on multi-speed bicycles. Typically, one shifting mechanism is a front shifting mechanism, while the other shifting mechanism is a rear shifting mechanism. Each shifting mechanism usually has one shift cable coupled thereto that includes an inner wire. The wires of the front and rear shifting mechanisms are coupled to the front and rear derailleurs to shift the chain over the various front and rear sprockets, respectively. While these prior shifting devices work well, some riders need a more comfortable and ergonomic shifting device especially with respect to movement of the shift levers.

In view of the above, there exists a need for a bicycle shift operating device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle shift operating device that smoothly and reliably shifts a bicycle derailleur.

Another object of the present invention is to provide a bicycle shift operating device that has ergonomic shift operating members (e.g. shift levers).

Yet another object of the present invention is to provide a bicycle shift operating device, which includes shift operating members that move along non-parallel, non-perpendicular shifting planes.

The foregoing objects can basically be attained by providing a bicycle shift operating device that includes a first shift operating member, a second shift operating member and a transmission control mechanism. The first shift operating member is pivotally coupled to a first pivot axle for rotation about a first pivot axis to move along a first shifting plane that is perpendicular to the first pivot axis. The second shift operating member is pivotally coupled to a second pivot axle for rotation about a second pivot axis to move along a second shifting plane that is perpendicular to the second pivot axis and intersects the first shifting plane to form an angle equal to or less than about thirty degrees therebetween. The transmission control mechanism is configured to control a bicycle transmission. The transmission control mechanism is operatively coupled to the first and second shift operating members.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
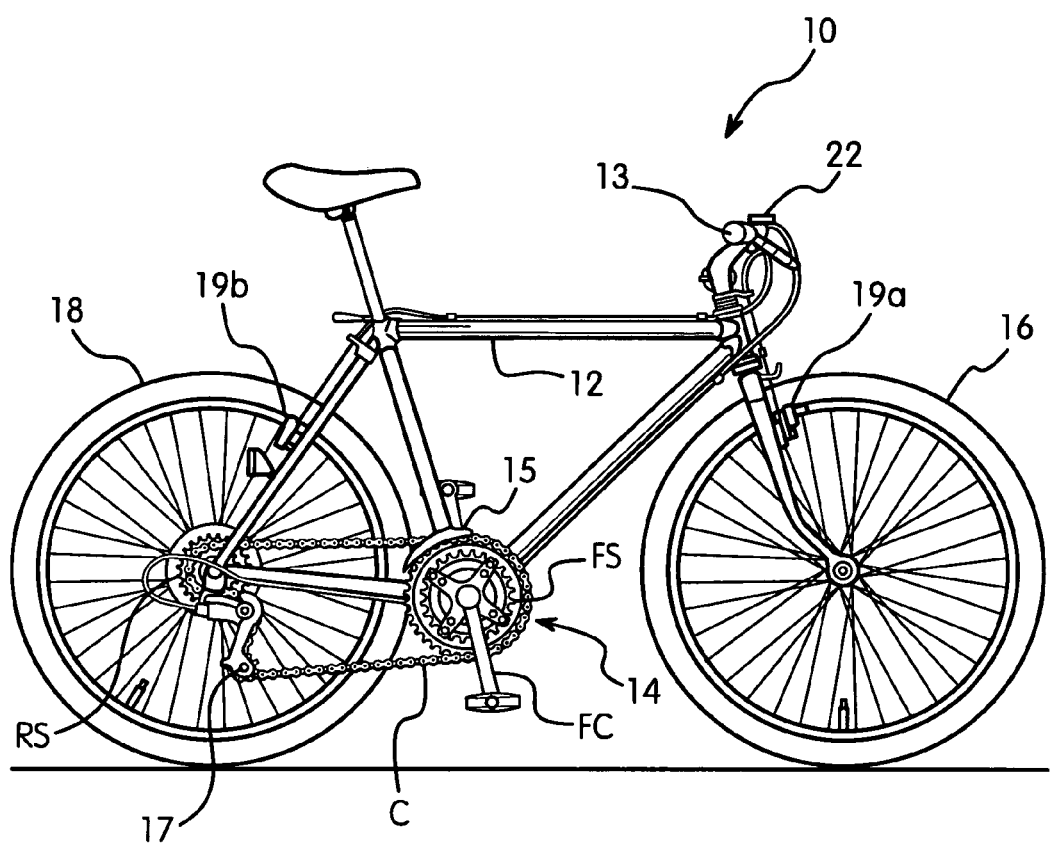
FIG. 1 is a side elevational view of a bicycle with front and rear shift operating devices coupled thereto in accordance with a preferred embodiment of the present invention.
Figure 2:
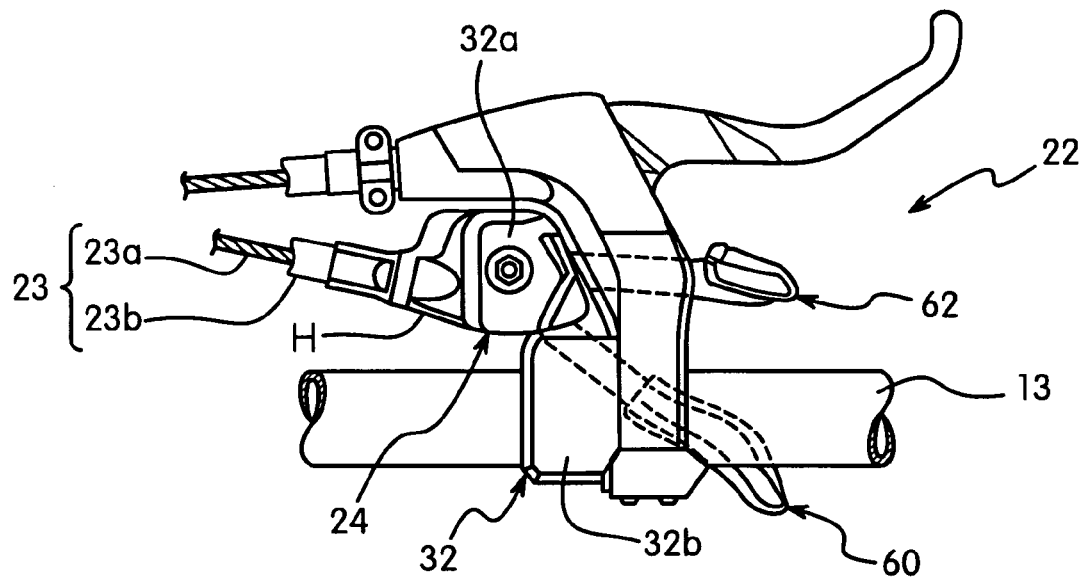
FIG. 2 is an enlarged top plan view of the rear shift operating device in accordance with the present invention.
Figure 3:
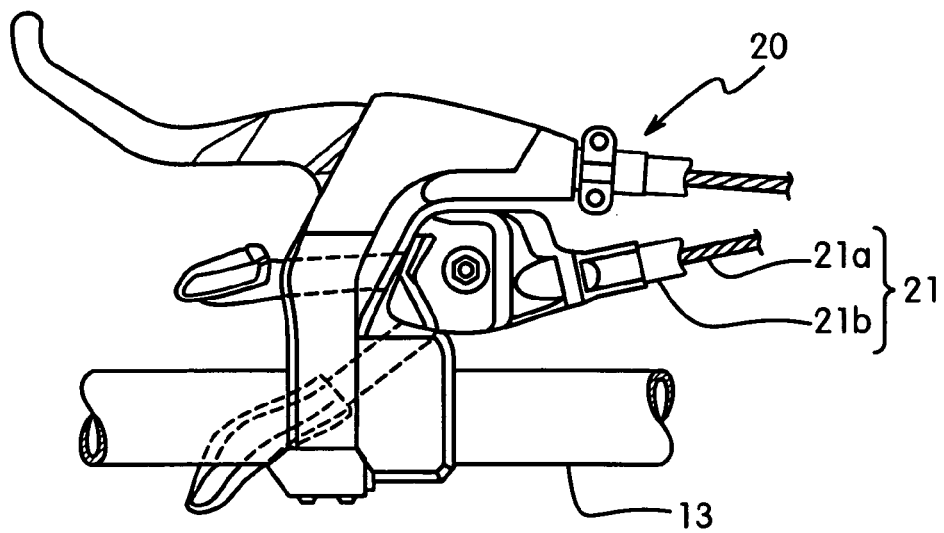
FIG. 3 is an enlarged top plan view of the front shift operating device in accordance with the present invention.

Referring initially to FIGS. 1-3, a bicycle 10 is illustrated with a front (first) shift operating device 20 and a rear (second) shift operating device 22 is illustrated in accordance with a first preferred embodiment of the present invention. The bicycle 10 basically includes a frame 12, a drive train or transmission 14, a front wheel 16 and a rear wheel 18. The frame 12 includes a handlebar 13 with a center axis or centerline A pivotally coupled thereto. Specifically, the handlebar 13 is fixedly coupled to the front fork of the frame 12 to steer the bicycle 10 via the front wheel 16.

The drive train or transmission 14 includes a front derailleur 15, a rear derailleur 17, a chain C, a plurality of rear sprockets RS coupled to the rear wheel 18 and a front crank FC with a plurality of front sprockets FS coupled thereto. The front and rear derailleurs 15 and 17 are coupled to the frame 12 to move/shift the chain C laterally between the various sprockets FS and RS in a relatively conventional manner. The rear sprockets RS are coupled to the rear wheel 18 via a free wheel to selectively rotate the rear wheel 18 via the chain C in order to propel the bicycle 10 in a conventional manner.

The front shift operating device 20 is operatively coupled to the front derailleur 15 via a front (first) bowden control cable 21 in order to shift the front derailleur 15 laterally over the front sprockets FS in a relatively conventional manner. Similarly, the rear shift operating device 22 is operatively coupled to the rear derailleur 17 via a rear (second) bowden control cable 23 to shift the rear derailleur 17 laterally over the rear sprockets RS in a relatively conventional manner. The front and rear control cables 21 and 23 are identical except for their lengths, and are basically conventional. Thus, the control cable 21 includes an inner wire 21a slidably received within an outer casing 21b, while the control cable 23 includes an inner wire 23a slidably received within an outer casing 23b.

A front brake 19a is coupled to the front fork of the bicycle frame 12, while a rear brake 19b is coupled to the rear triangle of the bicycle frame 12. The front and rear brakes 19a and 19b selectively apply a friction force to the front and rear rims of the front and rear wheels 16 and 18 to selectively stop the rotation of the front and rear wheels 16 and 18, respectively in a conventional manner. In the illustrated embodiment, each of the front and rear shift operating devices 20 and 22 is separate from the respective brake operating devices. However, it will be apparent to those skilled in the art from this disclosure that the shift operating devices 20 and 22 could be designed to have integrated brake operating devices.

The various parts of the bicycle 10 are conventional, except for the front and rear shift operating devices 20 and 22 as discussed below. Thus, the remaining parts of the bicycle 10 will not be discussed or illustrated in detail herein, except as they relate to the front and rear shift operating devices 20 and 22. Accordingly, it will be apparent to those skilled in the art from this disclosure that various modifications can be made to the various components or parts of the bicycle 10 without departing from the scope of the present invention.

Moreover, the front (left) shift operating device 20 is identical to the rear (right) shift operating device 22, except the front shift operating device 20 is a mirror image of the rear shift operating device 22 and the front shift operating device 20 includes only three shift positions to move the chain C laterally over the three front sprockets FS. Accordingly, the front shift operating device 20 will not be explained and/or illustrated in detail herein. Rather, it will be apparent to those skilled in the art from this disclosure that the descriptions, illustrations and principles of the rear shift operating device 22 constructed in accordance with the present invention are also applied to the front shift operating device 20 (i.e. a mirror image of the rear shift operating device 22 but with fewer shift positions).

Figure 4:
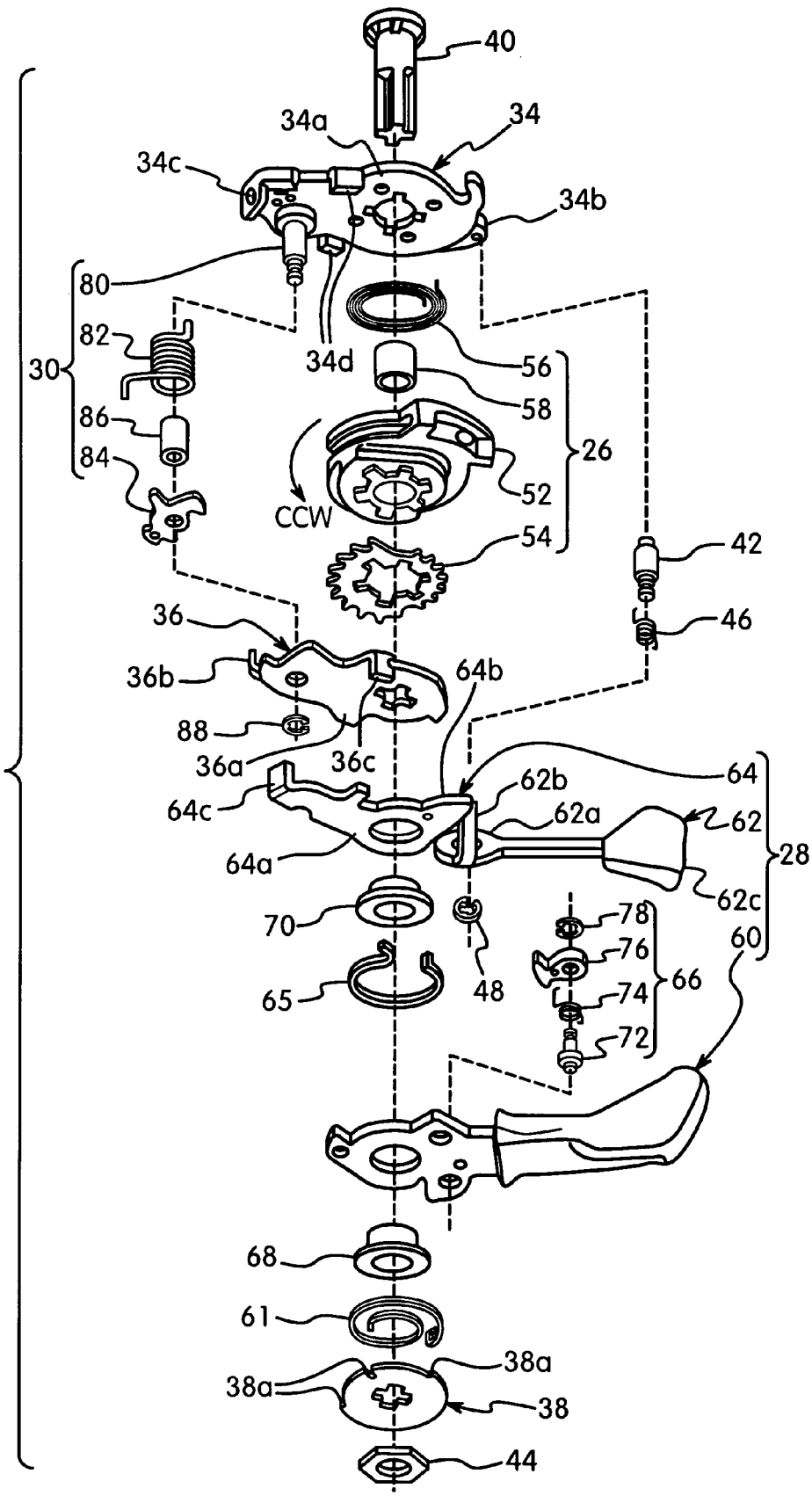
FIG. 4 is an exploded, lower perspective view of the rear shift operating device illustrated in FIG. 2.

Referring mainly to FIGS. 2 and 4, the rear shift operating device 22 basically includes a mounting assembly 24, a transmission control mechanism (e.g. a winding mechanism) 26, an operating mechanism 28 and a retaining mechanism 30 coupled together to shift the rear derailleur 17 and the chain C of the transmission 14 between the rear sprockets RS. In the illustrated embodiment, there are preferably more than three rear sprockets RS (e.g. eight or nine rear sprockets RS). Thus, the rear shift operating device 22 also preferably has more than three shift positions (e.g. eight or nine shift positions). In any event, the rear shift operating device 22 preferably has a number of shift positions that corresponds to the number of shift positions of the rear derailleur 17. Of course, it will be apparent to those skilled in the art from this disclosure that the rear derailleur 17 and the rear shift operating device 22 could be designed with a different number of shift positions if needed and/or desired.

The transmission control mechanism 26, the operating mechanism 28 and the retaining mechanism 30 are supported by the mounting assembly 24. The transmission control mechanism 26 is controlled by the operating mechanism 28 and the retaining mechanism 30 to selectively maintain the rear derailleur 17 in each of a plurality of shift positions via the control cable 23. Thus, the inner wire 23a of the control cable 23 and the rear derailleur 17 are also selectively retained in each of a plurality of shift positions. The inner wire 23a of the rear control cable 23 is coupled to the transmission control mechanism 26 such that movement (rotation) of the transmission control mechanism 26 takes-up (winds) or lets-out (unwinds) the inner wire 23a of the control cable 23 to actuate/move/shift the rear derailleur 17 between the rear sprockets RS.

Of course, it will be apparent to those skilled in the art from this disclosure that the transmission control mechanism 26 does not have to be mechanical and/or cable activating as needed and/or desired. For example, it will be apparent to those skilled in the art from this disclosure that the transmission control mechanism 26 could be configured to actuate electrical and/or pneumatic bicycle component(s) as needed and/or desired. Furthermore, it will be apparent to those skilled in the art from this disclosure that even if the transmission control mechanism 26 is mechanical and designed to be used with the control cable 23, that various structures for the transmission control mechanism are possible that take-up and let out the inner wire 23a, as needed and/or desired without departing from the present invention.

Referring mainly to FIGS. 2 and 4-6, the mounting assembly 24 basically includes a plurality of fixed members non-movably coupled together to form a structure that supports the transmission control mechanism 26, the operating mechanism 28 and the retaining mechanism 30. More specifically, the mounting assembly 24 basically includes a main or handlebar mounting portion 32, a base plate 34, an intermediate plate 36 and a lever retaining plate 38. The base plate 34, the intermediate plate 36 and the lever retaining plate 38 are basically fixedly coupled together by a main fixing bolt 40 (first fixed pivot axle) and a fixing nut 44.

The base plate 34, the intermediate plate 36 and the retaining plate 38 are preferably fixedly coupled together via the fixing bolt 40 in a spaced arrangement to accommodate parts of the transmission control mechanism 26, operating mechanism 28 and retaining mechanism 30 therebetween. Specifically, various other parts of the rear shift operating device 22 (i.e., parts of the transmission control mechanism 26, the operating mechanism 28 and the retaining mechanism 30) are either movably or non-movably coupled to parts of the mounting assembly 24, as discussed below in more detail. The base plate 34, the intermediate plate 36 and the retaining plate 38 are non-rotatably mounted on the main fixing bolt 40.

More specifically, the retaining mechanism 30 is coupled between the base plate 34 and the intermediate plate 36, as explained below. Some parts of the operating mechanism 28 are pivotally mounted for rotation about a first pivot axis X of the first fixed pivot axle 40. A second fixed pivot pin 42 is non movably coupled to the base plate 34 to support other parts of the operating mechanism 28 for rotation about a second pivot axis Y that is inclined relative to the first pivot axis X in accordance with the present invention. Preferably, the second pivot axis Y is non-parallel and non-perpendicular relative to the first pivot axis X. In the illustrated embodiment, the second pivot axis Y does not intersect the first pivot axis X. The arrangement of the pivot axes X and Y will be explained in more detail below.

Preferably, a housing H encloses the parts of the rear shift operating device 22 in a conventional manner. Specifically, the housing H preferably has two pieces either snap fitted together or connected by fasteners to enclose the parts of the mounting assembly 24 (i.e. the base plate 34, the intermediate plate 36 and the lever retaining plate 38), the transmission control mechanism 26, the operating mechanism 28 and retaining mechanism 30. The housing H can be constructed of plastic, a lightweight metallic material or any other material that is known in the art in a conventional manner. The handle-bar mounting portion 32 is non-movably fixedly coupled to the housing H and/or the base plate 34 in a conventional manner. The housing H is not critical to the present invention. Moreover, housings such as housing H are well known in the art. Accordingly, the housing H will not be discussed and/or illustrated in detail herein.

The handlebar mounting portion 32 basically includes a main/shift mounting plate 32a and a handlebar mounting bracket (i.e. a tubular clamping section) 32b. Optionally, the right hand side (rear) brake control device can be integrated with the main mounting portion 32 in a conventional manner. Preferably, the main/shift mounting plate 32a and the handlebar mounting bracket 32b are integrally formed together as a one-piece unitary member that is non-movably coupled to the handlebar 13 via the mounting bracket 32b and a threaded fastener 32c in a conventional manner. The handlebar mounting portion 32 is preferably constructed of a lightweight rigid material such as cast aluminum. Of course, any suitable material could be utilized if needed and/or desired. In any case, the mounting assembly 24 and the housing H are non-movably coupled together.

Figure 6:
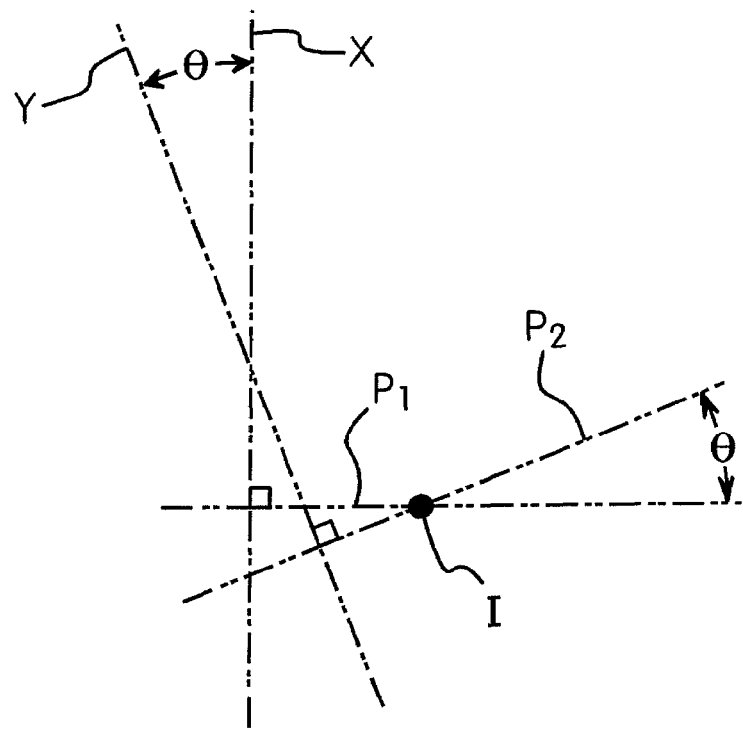
FIG. 6 is a diagrammatic, partial outside end elevational view of the rear shift operating device illustrated in FIGS. 2, 4 and 5, with the pivot axes, the shifting planes and the intersection line between the shifting planes shown for the purpose of illustration.
Figure 7:
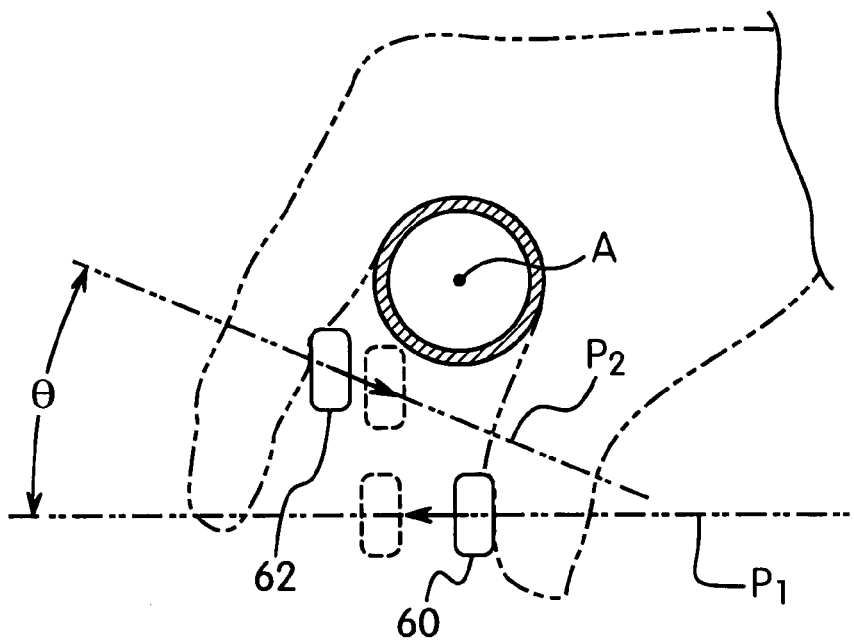
FIG. 7 is a partial inside end elevational view of the rear shift operating device illustrated in FIGS. 2 and 4-6, with the rider's hand and the moved/shifted (i.e. the shift operating members in first and second shift positions) shift operating members illustrated in phantom lines for the purpose of illustration.
Figure 8:
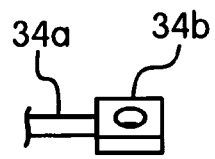
FIG. 8 is a partial, rear elevational view of the base plate of the rear shift operating device illustrated in FIGS. 2 and 4-7 in order to illustrate the angled arrangement of the secondary plate section relative to the main plate section.
Figure 9:
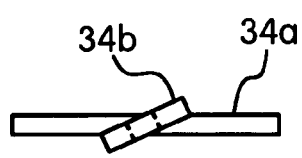
FIG. 9 is an outside end elevational view of the portion of the base plate of the rear shift operating device illustrated in FIG. 8 in order to illustrate the angled arrangement of the secondary plate section relative to the main plate section.
Figure 10:
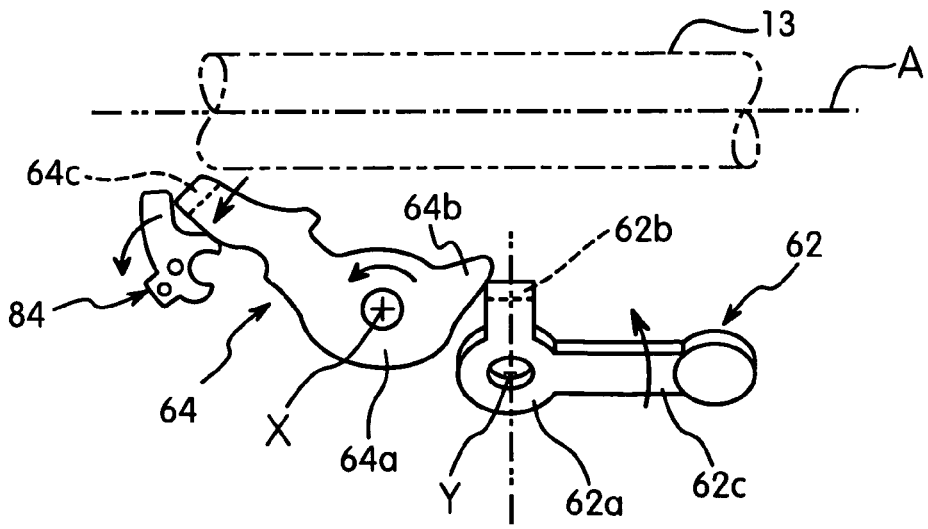
FIG. 10 is a partial bottom plan view of the rear shift operating device (i.e. the second shift operating member, the release member and the locking member) illustrated in FIGS. 2 and 4-9.
Figure 11:
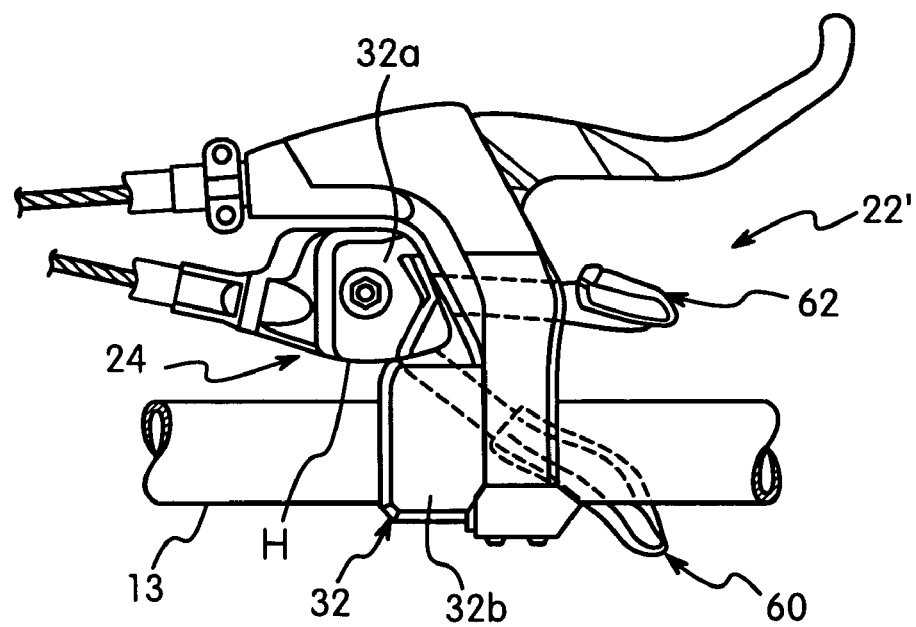
FIG. 11 is an enlarged top plan view of a rear shift operating device in accordance with a second embodiment of the present invention.
Figure 12:
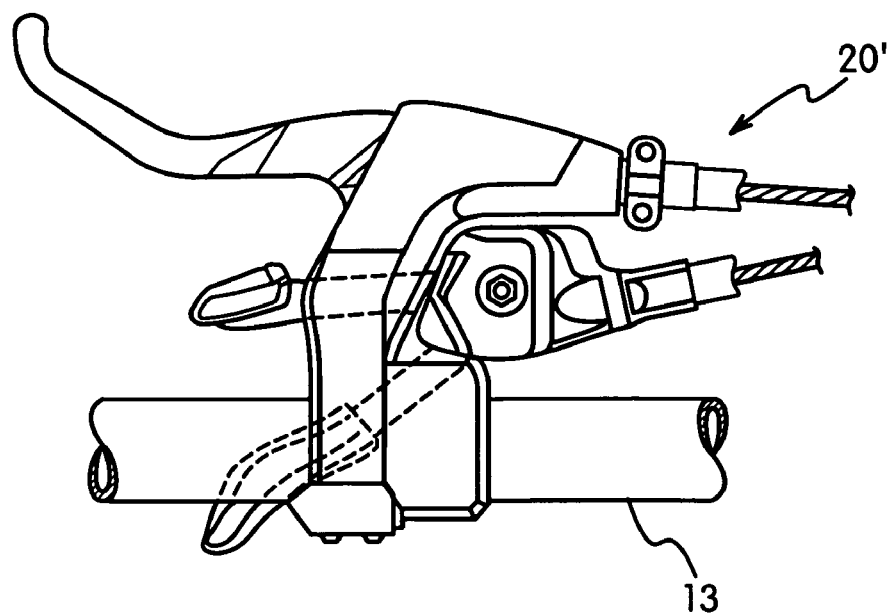
FIG. 12 is an enlarged top plan view of a front shift operating device in accordance with the second embodiment of the present invention.
Figure 13:
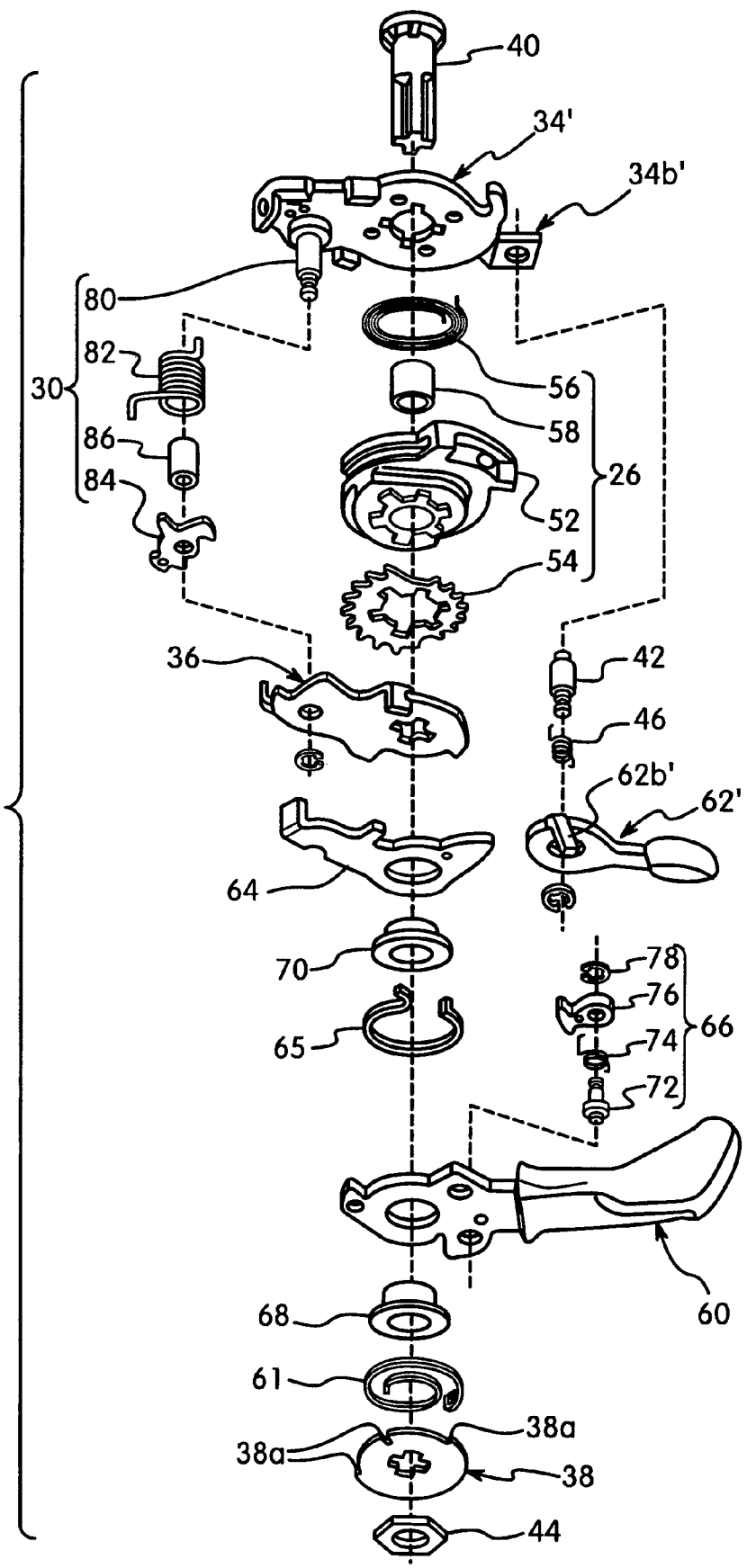
FIG. 13 is an exploded, lower perspective view of the rear shift operating device illustrated in FIG. 11.
Figure 14:
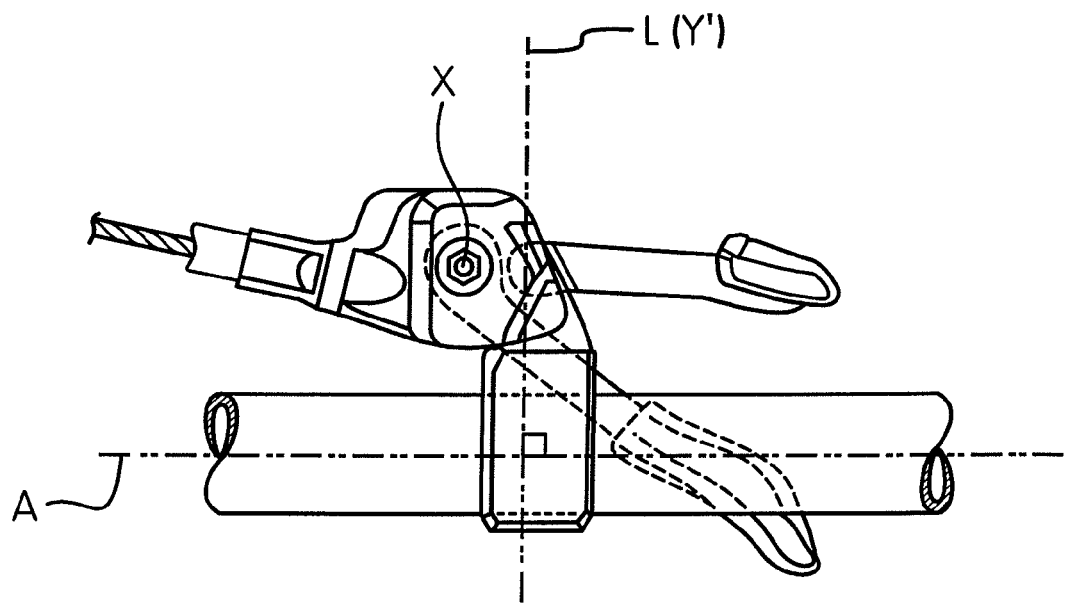
FIG. 14 is a further enlarged, top plan view of the rear shift operating device illustrated in FIGS. 11 and 13, with the shift operating members in their rest positions and with the handlebar centerline and the pivot axes of the shift operating members shown for the purpose of illustration.
Figure 15:
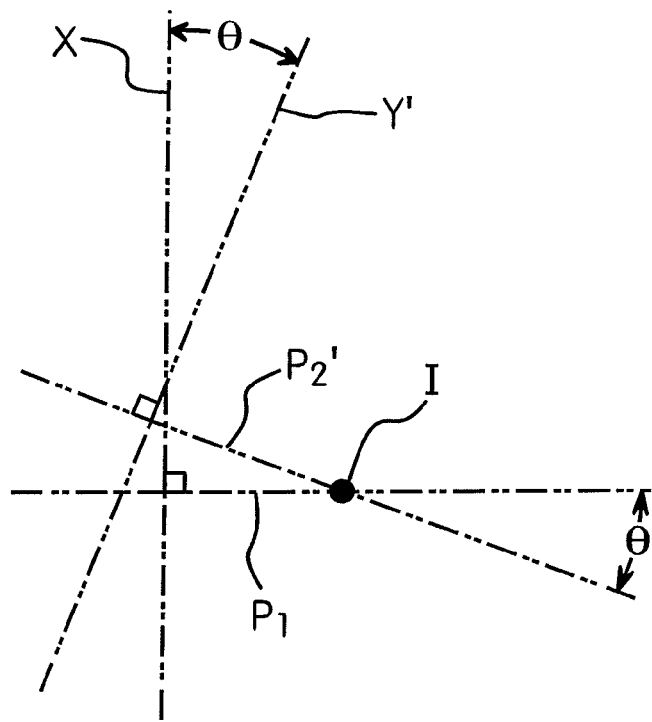
FIG. 15 is a diagrammatic, partial outside end elevational view of the rear shift operating device illustrated in FIGS. 11, 13 and 14, with the pivot axes, the shifting planes and the intersection line between the shifting planes shown for the purpose of illustration.
Figure 16:
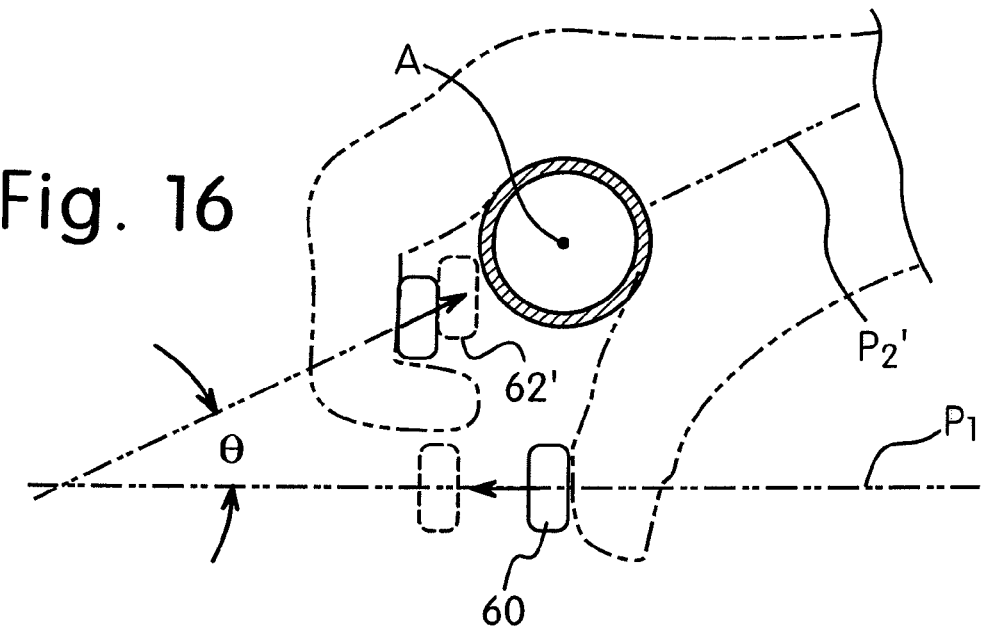
FIG. 16 is a partial inside end elevational view of the rear shift operating device illustrated in FIGS. 11 and 13-15, with the rider's hand and the moved/shifted (i.e. the shift operating members in first and second shift positions) shift operating members illustrated in phantom lines for the purpose of illustration.

Referring mainly to FIGS. 4, 8 and 9, the base plate 34 is a relatively thin, flat member. The base plate 34 basically includes a main plate section 34a and a secondary plate section 34b that is inclined relative to the main plate section 34a. The second fixed pivot pin is coupled to the secondary plate section 34b such that the second pivot axis Y is inclined relative to the first pivot axis X. The first pivot axle (bolt) 40 is coupled to the main plate section 34a such that the first pivot axis X extends perpendicularly relative to the main plate section 34a. The second fixed pivot pin 42 extends perpendicularly from the secondary plate section 34b such that the inclination between the first and second pivot axes X and Y corresponds to the inclination between the main plate section 34a and the secondary plate section 34b. In this embodiment, the upper end of the second pivot axis Y is located closer to the handlebar 13 than the lower end of the second pivot axis Y, as seen in FIG. 6.

The main plate section 34a non-rotatably supports the main fixing bolt 40, while the secondary plate 34b section non-movably supports the second fixed pivot axle 42. Specifically, the secondary plate section 34b preferably includes a non-circular opening configured to non-rotatably receive a mating projection of the second fixed pivot pin 42. The main plate section 34a has a cable support projection 34c extending downwardly therefrom to receive part of the control cable 23 in a conventional manner. Additionally, the main plate section 34a includes a pair of support projections 34d extending downwardly therefrom to contact the intermediate plate 36. The base plate 34 is preferably constructed of a lightweight rigid material such as sheet metal. The base plate 34 is located between the main mounting portion 32 and the intermediate plate 36. The base plate 34 has the main fixing bolt 40 non-rotatably engaged therewith to non-rotatably support the intermediate plate 36 and the lever retaining plate 38.

The intermediate plate 36 is preferably formed of several thin flat sections integrally formed together as a one-piece unitary member. The intermediate plate 36 is non-rotatably supported on the first fixed pivot axle 40. The intermediate plate 36 is preferably constructed of a lightweight rigid material such as deformed sheet metal. The intermediate plate 36 is located between the base plate 34 and the lever retaining plate 38. The transmission control mechanism 26 is supported between the lower surface of the base plate 34 and the upper surface of the intermediate plate 36 on the main fixing bolt 40. The intermediate plate 36 has a main plate section 36a, an upwardly extending projection 36b and a downwardly extending projection 36c. The intermediate plate 36 (e.g. the projections 36b and 36c) are arranged to selectively contact parts of the operating mechanism 28. The retaining mechanism 30 is supported between the main plate section 36a of the intermediate plate 36 and the main plate section 34a of the base plate 34. The retaining mechanism 30 further prevents relative rotation between the base plate 34 and the intermediate plate 36.

The lever retaining plate 38 is preferably a thin flat member. The lever retaining plate 38 is preferably constructed of a lightweight rigid material such as sheet metal. The lever retaining plate 38 is located on an opposite side of the intermediate plate 36 from the base plate 34. Thus, the lever retaining plate 38 is located furthest from the main mounting portion 32. The lever retaining plate 38 is fixedly and non-rotatably coupled to the base plate 34 via the fixing bolt 40. Specifically, the lever retaining plate 38 is non-rotatably engaged with the lower end of the main fixing bolt 40, and retained on the main fixing bolt 40 via the nut 44. Thus, the lever retaining plate 38, the intermediate plate 36 and the base plate 34 are fixedly and non-rotatably coupled together to form parts of the mounting assembly 24. The lever retaining plate 38 includes at least one biasing slot 38a that engages a part of the operating mechanism 28, as explained below. In the illustrated embodiment, the lever retaining plate 38 includes a plurality of biasing slots 38a. In this embodiment, the mounting assembly 24 is similar to the conventional mounting assembly disclosed in U.S. Pat. No. 6,694,840. Thus, the mounting assembly 24 will not be discussed and/or illustrated in further detail herein, except as needed to make and use the present invention.

Referring to FIGS. 4-10, the transmission control mechanism 26 will now be discussed in more detail. The transmission control mechanism 26 is mounted on the main fixing bolt 40 between the base plate 34 and the intermediate plate 36 of the mounting assembly 24, as mentioned above. In the illustrated embodiment, the transmission control mechanism 26 is a mechanical cable take-up mechanism that selectively pulls/releases the inner wire 23a of the control cable 23. The transmission control mechanism 26 basically includes a take-up member (cable winding member) 52, a ratchet member 54, a main biasing member 56 and a unit spacer 58. In the illustrated embodiment, the take-up member 52 and the ratchet member 54 are separate members that are non-rotatably coupled together. The main biasing member 56 is a torsion spring that normally biases the take-up member 52 and the ratchet member 54 in a predetermined rotational direction, e.g., the counter clockwise direction CCW as seen in FIG. 4. The transmission control mechanism 26 is operatively coupled to the operating mechanism 28 and the retaining mechanism 30 to selectively retain the take-up member 52 in a plurality of shift positions.

The take-up member 52 is preferably a step-shaped member formed as a one-piece unitary member by molding or the like. The take-up member 52 is preferably constructed of a lightweight rigid material such as hard plastic. The take-up member 52 is configured to have the inner wire 23a of the control cable 23 coupled thereto in a conventional manner. The take-up member 52 is freely rotatably coupled to the mounting assembly 24 for rotation about the main fixing bolt 40. However, the operating mechanism 28 and the retaining mechanism 30 control the rotation of the take-up member 52 through their engagement with the ratchet member 54, as explained below. The ratchet member 54 is non-rotatably coupled to the take-up member 52 to rotate therewith.

The ratchet member 54 is located between the take-up member 52 and the intermediate plate 36. The ratchet member 54 is preferably a thin flat member with a plurality of different shaped teeth formed in its outer surface to engage the operating mechanism 28 and the retaining mechanism 30. Preferably, the ratchet member 54 is constructed of a lightweight rigid material such as sheet metal. The biasing member 56 is preferably a torsion spring that is arranged to apply an urging force on the take-up member 52 and the ratchet member 54 about the main fixing bolt 40. The ends of the biasing member (spring) 56 engage the base plate 34 and the take-up member 52 to apply the biasing force. The unit spacer 58 is preferably a tubular member constructed of lightweight rigid material with one end contacting the lower surface of the base plate 34 and the other end contacting the upper surface of the intermediate plate 36 to space the intermediate plate 36 from the base plate 34.

The operating mechanism 28 moves the take-up member 52 via the ratchet member 54 against the urging force of the main biasing member 56 to take-up (wind) the control cable 23. The retaining mechanism 30 selectively retains the take-up member 52 and the ratchet member 54 in each of the shift positions. The retaining mechanism 30 can be released by the operating mechanism 28 to let out (unwind) the take-up member 52. In this embodiment, the transmission control mechanism 26 is similar to the conventional winding mechanism disclosed in U.S. Pat. No. 6,694,840. Thus, the transmission control mechanism 26 will not be discussed and/or illustrated in further detail herein, except as needed to make and use the present invention.

Referring still to FIGS. 4-10, the operating mechanism 28 will now be discussed in more detail. The operating mechanism 28 basically includes a first shift operating member (first shift lever) 60, a second shift operating member (second shift lever) 62, an operating or release plate (member) 64 and a pawl mechanism 66. The first shift operating member 60 is pivotally mounted on the main fixing bolt 40 (i.e. for rotation about the first pivot axis X), while the second shift operating member 62 is pivotally mounted on the second fixing bolt 42 (i.e. for rotation about the second pivot axis Y). The release member (plate) 64 is pivotally mounted on the main fixing bolt 40 adjacent the lower surface of the intermediate plate 36 (i.e. for rotation about the first pivot axis X).

The first shift operating member 60 is rotatably supported on the first fixed pivot axle 40 by a step-shaped tubular first spacer 68, while the release plate 64 supported on the first fixed pivot axle 40 by a step-shaped tubular second spacer 70. the first spacer 68 is configured to be partially received within the second spacer 70. The first operating member 60 is normally biased toward the first rest position by a first biasing member (torsion spring) 61, while the release plate 64 is normally biased to a rest position by a biasing member (torsion spring) 65 in a relatively conventional manner. In particular, the biasing member 61 has one end engaged with one of the biasing slots 38a of the lever retaining plate 38, and the other end engaged with the first operating member 60 to bias the first operating member in the counter clockwise direction CCW as seen in FIG. 4. The biasing member 65 has one end engaged with the release plate 64 and the other end engaged with the first operating member 60 to bias the release plate 64 in the clockwise direction as seen in FIG. 4.

The release plate 64 is operatively coupled between the second shift operating member 62 and the retaining mechanism 30 such that movement of the second shift operating member 62 from the second rest position to the second shift position actuates the retaining mechanism 30. In turn, the retaining mechanism 30 is operatively engaged with the transmission control mechanism 26 such that the second operating member 62 is moved to release or unwind the control cable 23, as explained below. The pawl mechanism 66 is mounted on the first shift operating member 60 such that movement of the first shift operating member 60 from the first rest position to the first shift position causes the pawl mechanism 66 to operatively engage the transmission control mechanism 26 to pull/wind the inner wire 23a of the control cable 23.

More specifically, the pawl mechanism 66 is configured to engage the ratchet member 54 when the first operating member 60 is pushed (rotated) or moved by the rider from the normal rest position to the shift position. The first operating member 60 pivots along a first shifting plane $P_1$ about the first pivot axis X of the main fixing bolt 40. The first shifting plane $P_1$ is perpendicular to the first pivot axis X. Thus, when the first operating member 60 is moved, the pawl mechanism 66 rotates the ratchet member 54 one shift position against the urging force of the biasing member 56. Thus, the take-up member 52 is also rotated to pull the inner wire 23a of the shift cable 23 and shift the rear derailleur 17 to the next shift position.

The pawl mechanism 66 basically includes a pawl pivot pin 72, a pawl spring 74 a pawl member 76 and a retaining clip 78. The pawl pivot pin 72 has a lower end mounted to the first operating member 60. The pawl member 76 is mounted on the upper end of the pawl pivot pin 72 with the pawl spring 74 normally biasing the pawl member 76 relative to the first operating member 60. Specifically, the pawl spring 74 has an upper end engaged with the pawl member 76 and a lower end engaged with the first operating member 60 to normally bias the pawl member 76 into engagement with the ratchet member 54. Thus, the pawl member 76 is configured to selectively contact the ratchet member 54.

Specifically, when the first operating member 60 is moved from the rest position to the shift position, the pawl member 76 engages the ratchet member 54 to rotate the ratchet member 54 and the take-up member 52 about the main fixing bolt 40. However, when the first operating member 60 is in a normal rest position, the pawl member 76 contacts the intermediate plate 36 to maintain the pawl member 76 out of engagement with the ratchet member 54. Thus, if the second operating member 62 is actuated, e.g., if the retaining mechanism 30 is released as discussed below, the ratchet member 54 and the take-up member 52 can rotate due to the urging force of the main biasing member 56.

When the first operating member 60 moves back to the normal rest position, the pawl mechanism 66 also engages the intermediate plate 36 to disengage the pawl mechanism 66 from the ratchet member 54. However, the retaining mechanism 30 engages the ratchet member 54 to hold the take-up member 52 and the ratchet member 54 in the new shift position against the urging force of the spring 56. In the illustrated embodiment, movement of the first operating member 60 causes only one shift of the take-up member 52 from one shift position to the next adjacent shift position in one rotational direction.

In this embodiment, the pawl mechanism 66 is similar to the conventional pawl mechanism disclosed in U.S. Pat. No. 6,694,840. Thus, the pawl mechanism 66 will not be discussed and/or illustrated in further detail herein, except as needed to make and use the present invention. Moreover, the first operating member 60 is relatively conventional and operates in a relatively conventional manner to wind the transmission control mechanism 26 via the pawl mechanism 66. Thus, the first operating member 60 will not be discussed and/or illustrated in detail herein, except as related to the present invention. In particular, the first operating member 60 will not be discussed and/or illustrated in detail herein except for its movement relative to the movement of the second operating member 62.

The second shift operating member 62 is operatively coupled to the retaining mechanism 30 via the release plate 64 to selectively release the ratchet member 54 and the take-up member 52. In other words, the rider pulls or moves the second operating member 62 along a second shifting plane $P_2$ to rotate about the second pivot axis Y to disengage the retaining mechanism 30 from the ratchet member 54, which allows the take-up member 52 and the ratchet member 54 to rotate under the urging force of the spring 56 to unwind the control cable 23. The second shifting plane $P_2$ is perpendicular to the second pivot axis Y.

Due to the arrangement of the first and second pivot axes X and Y (i.e. the first and second fixed pivot axles 40 and 42), the first and second shifting planes $P_1$ and $P_2$ intersect along an intersection line I to form an angle θ equal to or less than about thirty degrees therebetween to provide an optimal ergonomic arrangement.

Figure 5:
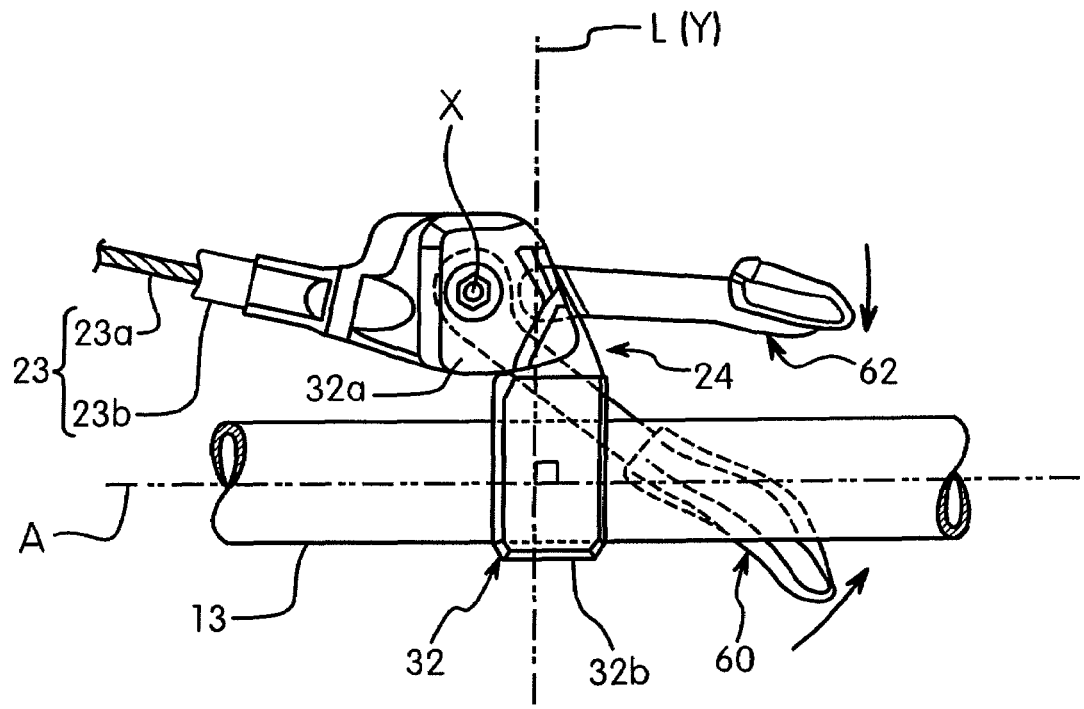
FIG. 5 is a further enlarged, top plan view of the rear shift operating device illustrated in FIGS. 2 and 4, with the shift operating members in their rest positions and with the handlebar centerline and the pivot axes of the shift operating members shown for the purpose of illustration.

In the illustrated embodiment, the first and second shifting planes $P_1$ and $P_2$ preferably intersect such that the intersection line I is substantially parallel to the centerline A of the handlebar 13. Thus, the second pivot axis Y preferably lies in a longitudinal plane L that is perpendicular to the centerline A, and the first pivot axis X is preferably parallel to the longitudinal plane L, as best seen in FIGS. 5 and 6. Moreover, the pivot point of the second shift operating member 62 (the location where the second pivot axis Y passes through the second operating member 62) is preferably further from the centerline A than the first pivot axis X.

The first shifting plane $P_1$ has a first (upper) side and a second (lower) side when the rear shift operating device 22 is coupled to the bicycle 10 in its normal riding position. In this embodiment, the second shifting plane $P_2$ diverges from the first shifting plane $P_1$ as the second shifting plane $P_2$ extends rearwardly from the intersection line I on the second side of the first shifting plane $P_1$ as best understood from FIG. 6. In other words, the second shifting plane $P_2$ diverges from the first shifting plane $P_1$ as the second shifting plane $P_2$ extends in the moving direction of the second shift operating member 62 on the second side of the first shifting plane $P_1$. However, it will be apparent to those skilled in the art from this disclosure that other orientations are possible without departing from the present invention. For example, the second shifting plane $P_2$ could be angled in the opposite direction from the first shifting plane $P_1$, as discussed below with reference to another preferred embodiment of the present invention.

However, it will be apparent to those skilled in the art from this disclosure that various modifications can be made to the present invention without departing from the scope of the present invention. For example, the intersection line I can be angled relative to centerline A of the handlebar 13. In any case, the shifting planes $P_1$ and $P_2$ are preferably perpendicular to the pivot axes X and Y, respectively, to intersect along a line I. In such an arrangement where the intersection line is not parallel to the centerline A, the orientations of the first and second pivot axes X and Y would be modified. In the illustrated embodiment, the first and second pivot axes X and Y preferably do not intersect each other. However, it will also be apparent to those skilled in the art from this disclosure that the pivot axes can intersect if needed and/or desired.

The retaining mechanism 30 is configured and arranged so that the take-up member 52 and the ratchet member 54 rotate only one shift position for each push of the second operating member 62. In other words, the ratchet member 54 engages the retaining mechanism 30 after rotating one shift position.

Thus, in the illustrated embodiment, movement of the second operating member 62 causes only one shift of the take-up member 52 from one shift position to the next adjacent shift position in another rotational direction opposite to the rotational direction caused by moving the first operating member 60.

Referring still to FIGS. 4-10, the second shift operating member 62 is preferably a thin flat member constructed of lightweight rigid material such as deformed sheet metal. The second shift operating member 62 basically includes a pivot or mounting section 62a, an actuating projection 62b and a rider operating section 62c. The actuating projection 62b is preferably angled relative to the mounting section 62a such that the actuating projection 62b is parallel to the first pivot axis X (perpendicular to the release plate 64). On the other hand, the pivot section 62a is preferably perpendicular to the second pivot axis Y (i.e. lies in the second shifting plane $P_2$). The actuating projection 62b extends upwardly from the mounting section 62a in this embodiment. The rider operating section 62c extends from the mounting section 62a.

The second shift operating member 62 is pivotally mounted on the secondary fixed pivot pin 42. More specifically, the second pivot pin 42 is at least partially received through the pivot section 62a to rotatably support the second shift operating member 62 about the second pivot axis Y, while a biasing member (spring) 46 is mounted on the pivot pin 42 to apply an urging force on the second shift operating member 42 to urge the second shift operating member 62 in the clockwise direction toward the second rest position. Specifically, one end of the biasing member 46 engages the second fixed pivot pin 42, which is non-movable relative to the base plate 34 in a conventional manner. The other end of the biasing member 46 engages the pivot section 62a of the second shift operating member 62 in a conventional manner. A retainer clip 48 retains the second operating member 62 on the second pivot pin 42 in a conventional manner. The actuating projection 62b is arranged and configured to contact the release plate 64.

The release member/plate 64 is preferably a thin flat member constructed of a lightweight rigid material such as deformed sheet metal. More specifically, the release plate 64 basically includes a coupling portion 64a, an operating portion 64b and a release flange 64c extending upwardly from the coupling portion 64a in a laterally spaced arrangement from the first pivot axle 40. The release plate 64 is pivotally mounted on the first pivot pin 40. The operating portion 64b contacts the actuating projection 62b, while the release flange 64c selectively engages the retaining mechanism 30, as explained below in more detail. Thus, the release plate 64 is operatively coupled to both the retaining mechanism 30 and the second shift operating member 62.

Referring still to FIGS. 4-10, the retaining mechanism 30 will now be discussed in more detail. The retaining mechanism 30 basically includes a retaining pivot pin 80, a retaining biasing member 82, a locking member 84, a tubular spacer 86 and a retainer clip 88. The retaining pivot pin 80 is coupled to the base plate 34 and the intermediate plate 36 to prevent movement thereof. The locking member 84 is rotatably mounted on the retaining pivot pin 80. The retaining biasing member 82 normally biases the locking member 84 toward a predetermined position. The locking member 84 is arranged and configured to engage the ratchet member 54. Moreover, the locking member 84 is also arranged and configured to selectively engage the release flange 64c of the release plate 64. In this embodiment, the retaining mechanism 30 is similar to the conventional retaining mechanism disclosed in U.S. Pat. No. 6,694,840. Thus, the retaining mechanism 30 will not be discussed and/or illustrated in further detail herein, except as needed to make and use the present invention.

When the second operating member 62 is actuated/rotated, the actuating projection 62b causes the release plate 64 to rotate against the biasing force of the biasing member 65. Thus, the release flange 64c engages the locking member 84 to move the locking member 84 against the biasing force of the spring 82. This moves the locking member 84 temporarily out of engagement with the ratchet member 54. Thus, the ratchet member 54 and the take-up member 52 are rotated one shift position due to the biasing force of the main biasing member or spring 56. When the second operating member 62 is released, the locking member 84 rotates via the biasing force of the spring 82 to engage the next tooth of the ratchet member 54 to hold the ratchet member 54 and the take-up member 52 in the desired shift position, and the release plate 64 and the second operating member 62 rotate back to their rest positions due to the urging forces of the biasing members 65 and 46.

Referring to FIGS. 5-7 and 10, operation of the rear shift operating device 22 will now be discussed in more detail. When the rider wishes to shift the rear derailleur 17 and the chain C from a smaller rear sprocket RS to a larger rear sprocket RS, the rider pushes the first operating member 60 with a thumb or finger. The first operating member 60 moves along the first shifting plane $P_1$ about the pivot axis X to the shift position. This movement of the first operating member 60 causes the pawl mechanism 66 to move with the first operating member 60.

When the pawl mechanism 66 moves, the pawl member 76 moves out of engagement with the intermediate plate 36. The pawl member 76 then engages the ratchet member 54 to rotate the ratchet member 54 and the take-up member 52 one shift position. When the ratchet member 54 is rotated from one shift position to the next adjacent shift position by the pawl mechanism 66, the locking member 84 is moved out of engagement with its respective tooth and into engagement with the next respective tooth of the ratchet member 54. Specifically, as the ratchet member 54 moves between two shift positions, the locking member 84 disengages and then reengages the teeth of the ratchet member to retain the ratchet member 54 in the next shift position.

When the first operating member 60 is released by the rider, the first operating member 60 moves back to its normal rest position due to the urging force of the biasing member 61. This movement of the first operating member 60 causes the pawl mechanism 66 to move. Thus, the pawl member 76 moves back into engagement with the intermediate plate 36 so that the pawl member 76 is out of engagement with the ratchet member 54. However, the ratchet member 54 is retained in its shift position due to the locking member 84. If the rider desires to shift from a smaller rear sprocket RS to a larger rear sprocket RS again, the first operating member 60 is pushed again and the process described above is repeated.

If the rider desires to shift the rear derailleur 17 and the chain C from a larger rear sprocket RS to a smaller rear sprocket RS, the rider pulls the second operating member 62 with a thumb or finger. When the second operating member 62 is actuated by the rider, the second operating member 62 moves along the second the second shifting plane $P_2$ about the second pivot axis Y from the normal rest position to the shift position. Specifically, when the second operating member 62 is moved to the shift position, the actuating projection 62b engages the release plate 64 to rotate the release plate 64 about the first pivot axis X. The releasing flange 64c of the release plate 64 then engages the locking member 84. The locking member 84 is rotated against the biasing force of the spring 82 out of engagement with the teeth of the ratchet member 54. The ratchet member 54 can then rotate under the biasing force of the main biasing member or spring 56.

The locking member 84 will then engage the next adjacent tooth of the ratchet member 54 upon releasing the second operating member 62, and thus, the release plate 64. In other words, when the rider then releases the second operating member 62, both the second operating member 62 and the release plate 64 will return to their normal rest positions under the biasing force of the return springs 46 and 65, respectively. Thus, the release flange 64c will release the locking member 84. In other words, the second operating member 62 is designed to be pulled and released relatively quickly by the rider. The locking member 84 then non-rotatably engages the next adjacent tooth of the ratchet member 54 and the shift from the larger rear sprocket RS to the smaller rear sprocket RS is complete. This process can then be repeated by the rider if desired.

The structure and operation of the rear shift operating device 22 is relatively conventional, except as otherwise explained and illustrated herein. In particular, the structure and operation of the rear shift operating device 22 is similar to U.S. Pat. No. 6,694,840, except for the arrangement of the base plate 34, the first and second operating members 60 and 62 and the release plate 64 of the present invention, and the modifications to other parts so as to be compatible with the present invention. In other words, the structure and operation of a conventional rear shift operating device that is similar to the present invention can be better understood from U.S. Pat. No. 6,694,840.

SECOND EMBODIMENT

Referring now to FIGS. 11-19, modified front and rear shift operating devices 20' and 22' designed to be used on the bicycle 10 in accordance with a second preferred embodiment will now be explained. The modified front and rear shift operating devices 20' and 22' designed to be used in place of the front and rear shift operating devices 20 and 22 of the first embodiment. Similar to the first embodiment, the front shift operating device 20' is identical to the rear shift operating device 22', except the front shift operating device 20' is a mirror image of the rear shift operating device 22' and the front shift operating device 20' includes only three shift positions to move the chain C laterally over the three front sprockets FS. Accordingly, the front shift operating device 20' will not be explained and/or illustrated in detail herein. Rather, it will be apparent to those skilled in the art from this disclosure that the descriptions, illustrations and principles of the rear shift operating device 22' constructed in accordance with the present invention are also applied to the front shift operating device 20' (i.e. a mirror image of the rear shift operating device 22 but with fewer shift positions).

The modified rear shift operating device 22' is basically identical to the rear shift operating device 22 of the first embodiment, except the modified rear shift operating device 22' includes a modified second shift operating member 62' that pivots along a second shifting plane $P_2$' about a second pivot axis Y' that are oriented differently than in the first embodiment. In particular, the second pivot axis Y' is angled in an opposite orientation from the orientation of the second pivot axis Y of the first embodiment. However, all of the parts of this second embodiment are functionally identical to the parts of the first embodiment. Also, the parts of this second embodiment are structurally identical to the parts of the first embodiment, except as explained and illustrated otherwise herein. Moreover, the dimensional relationships described with reference to the first embodiment also apply to this second embodiment, except that the second pivot axis Y' is oriented in an opposite direction from the second pivot axis Y of the first embodiment.

Accordingly, the parts of this second embodiment will not be explained and/or illustrated in detail herein, except as related to the present invention. Rather, it will be apparent to those skilled in the art from this disclosure that the descriptions and illustrations of the first embodiment also apply to this second embodiment, except as explained and illustrated herein. Finally, parts of this second embodiment that are identical to parts of the first embodiment will be identified with identical reference numerals for the sake of convenience.

Figure 17:
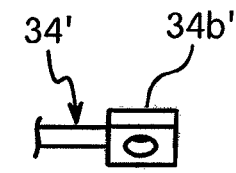
FIG. 17 is a partial, rear elevational view of the base plate of the rear shift operating device illustrated in FIGS. 11 and 13-16 in order to illustrate the angled arrangement of the secondary plate section relative to the main plate section.
Figure 18:
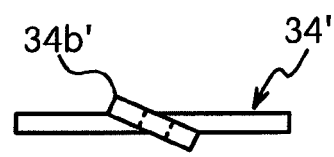
FIG. 18 is an outside end elevational view of the portion of the base plate of the rear shift operating device illustrated in FIG. 17 in order to illustrate the angled arrangement of the secondary plate section relative to the main plate section.
Figure 19:
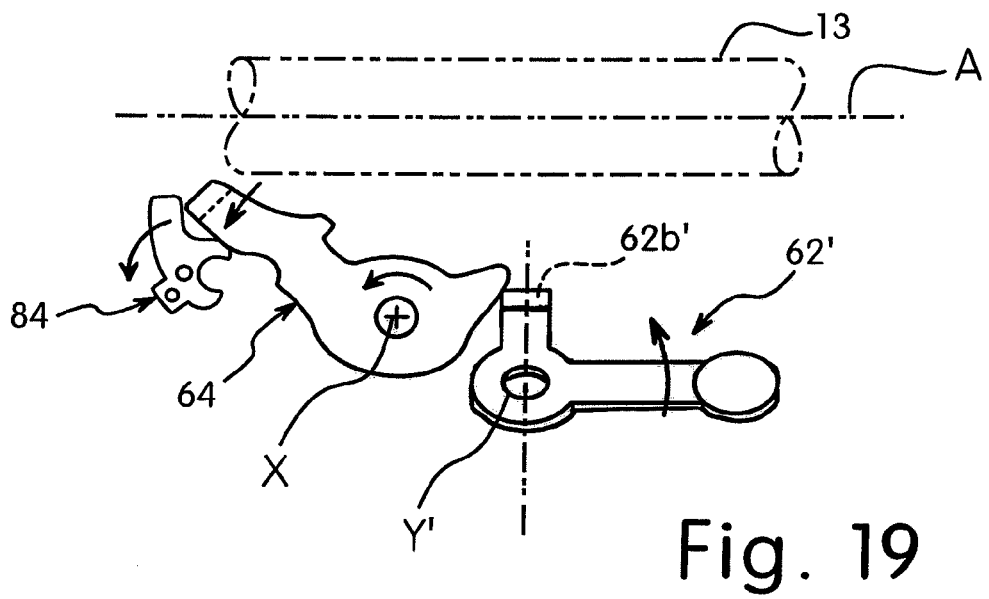
FIG. 19 is a partial bottom plan view of the rear shift operating device (i.e. the second shift operating member, the release member and the locking member) illustrated in FIGS. 11 and 13-18.

The modified rear shift operating device 22' basically includes the modified second shift operating member 62' and a modified base plate 34'. Specifically, the base plate 34' is identical to the base plate 34 of the first embodiment, except the base plate 34' includes a modified secondary plate section 34b' that is angled in the opposite direction from the secondary plate section 34b of the first embodiment, as best seen in FIGS. 17 and 18. The modified second shift operating member 62' is identical to the second shift operating member 62 of the first embodiment, except the second shift operating member 62' includes a modified actuating projection 62b' that extends downwardly therefrom.

Due to the arrangements of the modified secondary plate section 34b' and the modified second shift operating member 62', the second shift operating member 62' rotates along the modified second shifting plane $P_2 \propto$ about the second pivot axis Y'. Thus, in this embodiment, the second shifting plane P2' diverges from the first shifting plane $P_1$ as the second shifting plane $P_2$' extends rearwardly from the intersection line I on the first side of the first shifting plane $P_1$ as best understood from FIG. 15. In this embodiment, the intersection line I is preferably located differently (e. a., forwardly) of the intersection line I of the first embodiment, as best understood from FIGS. 6, 7, 15 and 16. In other words, the second shifting plane $P_2$' diverges from the first shifting plane $P_1$ as the second shifting plane $P_2$' extends in the moving direction of the second shift operating member 62' on the first side of the first shifting plane $P_1$.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. A bicycle shift operating device comprising:
a mounting member adapted to be mounted on a handlebar;

a first shift operating member pivotally coupled to a first pivot axle for rotation about a first pivot axis to move along a first shifting plane that is perpendicular to the first pivot axis;

a second shift operating member pivotally coupled to a second pivot axle for rotation about a second pivot axis to move along a second shifting plane that is perpendicular to the second pivot axis and intersects the first shifting plane;

a transmission control mechanism configured to control a bicycle transmission, the transmission control mechanism including a cable take-up mechanism configured to be retained in a plurality of shift positions, the cable take-up mechanism being operatively coupled to the first and second shift operating members such that movement of the first and second shift operating members selectively moves the cable take-up mechanism; and a release member pivotally mounted relative to the mounting member about a release pivot axis offset from the second pivot axis, the release member being operatively coupled to the second shift operating member such that movement of the second shift operating member moves the release member about the release pivot axis, the cable take-up mechanism further including a cable take-up member, a ratchet member and a locking member that is operatively engaged with the ratchet member to hold the cable take-up member in the plurality of shift positions, the locking member being pivotally mounted relative to the mounting member about a locking pivot axis that is offset from the release pivot axis and the second pivot axis, and the second shift operating member moving the release member about the release pivot axis when the second shift operating member is moved from a second rest position to a second shift position about the second pivot axis, and the locking member being moved about the locking pivot axis by the movement of the release member about the release pivot axis.

2. The bicycle shift operating device according to claim 1, wherein the first shift operating member is operatively coupled to the cable take-up mechanism to pull a cable when the first shift operating member is moved from a first rest position to a first shift position.

3. The bicycle shift operating device according to claim 2, wherein the second shift operating member is operatively coupled to the cable take-up mechanism to release the cable upon moving the second shift operating member from the second rest position to the second shift position.

4. The bicycle shift operating device according to claim 3 wherein the first shift operating member is moved forwardly when the first shift operating member is moved from the first rest position to the first shift position, and the second shift operating member is moved backwardly when the second shift operating member is moved from the second rest position to the second shift position.

5. The bicycle shift operating device according to claim 1, wherein the bicycle shift operating device includes a handlebar mounting portion configured and arranged to be fixedly coupled to a bicycle handlebar.

6. The bicycle shift operating device according to claim 5, wherein the first shifting plane has a first side and a second side, the second shifting plane diverges from the first shifting plane as the second shifting plane extends in the moving direction of the second shift operating member on the first side of the first shifting plane.

7. The bicycle shift operating device according to claim 5, wherein the first shifting plane has a first side and a second side, the second shifting plane diverges from the first shifting plane as the second shifting plane extends in the moving direction of the second shift operating member on the second side of the first shifting plane.

8. The bicycle shift operating device according to claim 1, wherein the first shift operating member is moved forwardly when the first shift operating member is moved from a first rest position to a first shift position, and the second shift operating member is moved backwardly when the second shift operating member is moved from a second rest position to a second shift position.

9. The bicycle shift operating device according to claim 3 wherein the second shift operating member moves toward the first shifting plane when the second shift operating member is moved from the second rest position to the second shift position.

10. The bicycle shift operating device according to claim 1, wherein a first free end of the first shift operating member moves closer to a second free end of the second shift operating member as measured in a direction parallel to the first shifting plane when the first shift operating member is moved to a first shift position from a first rest position, and the second free end of the second shift operating member moves closer to the first free end of the first shift operating member as measured in a direction parallel to the first shifting plane when the second shift operating member is moved to the second shift position from the second rest position.

11. The bicycle shift operating device according to claim 10, wherein the first shift operating member is operatively coupled to the cable take-up mechanism to pull a cable when the first shift operating member is moved from a first rest position to a first shift position.

12. The bicycle shift operating device according to claim 11, wherein the second shift operating member is operatively coupled to the cable take-up mechanism to release the cable upon moving the second shift operating member from a second rest position to a second shift position.

13. The bicycle shift operating device according to claim 12 wherein the first shift operating member is moved forwardly when the first shift operating member is moved from the first rest position to the first shift position, and the second shift operating member is moved backwardly when the second shift operating member is moved from the second rest position to the second shift position.

14. The bicycle shift operating device according to claim 10, wherein the bicycle shift operating device includes a handlebar mounting portion configured and arranged to be fixedly coupled to a bicycle handlebar.

15. The bicycle shift operating device according to claim 14, wherein the first shifting plane has a first side and a second side, the second shifting plane diverges from the first shifting plane as the second shifting plane extends in the moving direction of the second shift operating member on the first side of the first shifting plane.

16. The bicycle shift operating device according to claim 14, wherein
the first shifting plane has a first side and a second side,
the second shifting plane diverges from the first shifting plane as the second shifting plane extends in the moving direction of the second shift operating member on the second side of the first shifting plane.

17. The bicycle shift operating device according to claim 10, wherein
the first shift operating member is moved forwardly when the first shift operating member is moved from a first rest position to a first shift position, and the second shift operating member is moved backwardly when the second shift operating member is moved from a second rest position to a second shift position.

18. The bicycle shift operating device according to claim 1, wherein
the second shift operating member moves in a predetermined rotational direction about the second pivot axis when moved from the second rest position to the second shift position, as viewed along the second pivot axis, and the release member moves in the predetermined rotational direction about the release pivot axis when the second shift operating member is moved from the second rest position to the second shift position, as viewed along the second pivot axis.

19. The bicycle shift operating device according to claim 1, wherein
the locking pivot axis and the second pivot axis are disposed on opposite sides of a plane containing the first pivot axis that is parallel to the second pivot axis.

20. The bicycle shift operating device according to claim 1, wherein the release pivot axis is coincident with first pivot axis.

21. The bicycle shift operating device according to claim 1, wherein
the ratchet member and the cable take-up member are rotatably mounted about the first pivot axis.

22. The bicycle shift operating device according to claim 1, wherein
the release member remains stationary when the first shift operating member is moved from a first rest position to a first shift position about the first pivot axis.

23. The bicycle shift operating device according to claim 1, wherein
the locking pivot axis is located further from first pivot axis than the second pivot axis as measured along the first shifting plane.

* * * * *